(12) United States Patent
Bouat et al.

(10) Patent No.: US 10,951,664 B2
(45) Date of Patent: Mar. 16, 2021

(54) PROCESSING CALL FLOWS

(71) Applicant: HEWLETT PACKARD ENTERPRISE DEVELOPMENT LP, Houston, TX (US)

(72) Inventors: Sebastien Bouat, Grenoble (FR); Patrick Broyer, Grenoble (FR); Vijay Kamath, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 359 days.

(21) Appl. No.: 15/779,927

(22) PCT Filed: Jan. 26, 2016

(86) PCT No.: PCT/US2016/014811
§ 371 (c)(1),
(2) Date: May 30, 2018

(87) PCT Pub. No.: WO2017/095455
PCT Pub. Date: Jun. 8, 2017

(65) Prior Publication Data
US 2018/0352006 A1    Dec. 6, 2018

(30) Foreign Application Priority Data
Nov. 30, 2015 (IN) .......................... 6423/CHE/2015

(51) Int. Cl.
*G06F 15/16* (2006.01)
*H04L 29/06* (2006.01)
*H04L 29/08* (2006.01)
(52) U.S. Cl.
CPC .......... *H04L 65/1006* (2013.01); *H04L 29/06* (2013.01); *H04L 29/08* (2013.01);
(Continued)

(58) Field of Classification Search
CPC ..... H04L 65/1006; H04L 29/06; H04L 29/08; H04L 65/1016; H04L 65/104; H04L 65/1083; H04L 65/1096
(Continued)

(56) References Cited

U.S. PATENT DOCUMENTS 7,835,276 B2* 11/2010 Naik .................... H04L 12/185
370/230
8,213,416 B2    7/2012 Ravishankar et al.
(Continued)

OTHER PUBLICATIONS

Hewlett Packard Enterprises, "HPE OpenCall Convergent Communication Platform Welcome Guide", Release 3.0.0, Second Edition, 2016, 36 pages.
(Continued)

*Primary Examiner* — Atta Khan

(57) ABSTRACT

A method of processing session initiation protocol (SIP) call flows, the method comprising, at a back-to-back user agent (B2BUA) maintaining a plurality of predetermined call flow behaviours, each call flow behaviour in the plurality being self-contained and independent from other call flow behaviours in the plurality, each call flow behaviour in the plurality being applicable at one or more given call flow stages to provide one or more given actions for addressing a given call flow scenario, in response to occurrence of a given trigger event in a given SIP call flow, selecting a call flow behaviour from the plurality of call flow behaviours, and causing execution of one or more actions associated with the selected call flow behaviour to address a call flow scenario in relation to the given SIP call flow.

19 Claims, 9 Drawing Sheets

(52) U.S. Cl.
    CPC ........ *H04L 65/104* (2013.01); *H04L 65/1016* (2013.01); *H04L 65/1083* (2013.01); *H04L 65/1096* (2013.01)

(58) Field of Classification Search
    USPC .......................................................... 709/228
    See application file for complete search history.

(56) References Cited

U.S. PATENT DOCUMENTS

| | | |
|---|---|---|
| 8,606,901 B2 | 12/2013 | Qiu et al. |
| 8,621,107 B2 | 12/2013 | Hannu et al. |
| 2006/0088050 A1 | 4/2006 | Kumar et al. |
| 2007/0070980 A1 | 3/2007 | Phelps |
| 2009/0006598 A1 | 1/2009 | Cosmadopoulos et al. |
| 2010/0008232 A1 | 1/2010 | Zave |
| 2010/0088425 A1* | 4/2010 | Hooda ............... H04W 4/029 709/231 |
| 2010/0131658 A1* | 5/2010 | Goyal ............... H04L 65/1006 709/228 |
| 2011/0122863 A1* | 5/2011 | Balasaygun ...... H04M 15/8228 370/352 |
| 2012/0082158 A1 | 4/2012 | Reddy et al. |
| 2015/0256461 A1* | 9/2015 | Mosko ................ H04L 45/7453 370/392 |

OTHER PUBLICATIONS

OpenCloud, "Rhino TAS—Telecom Application Server", available online at <https://web.archive.org/web/20170407005648/https://www.opencloud.com/products-solutions/tas/>, Apr. 7, 2017, 5 pages.

Rosenberg et al., "SIP: Session Initiation Protocol", Network Working Group, Request for Comments: 3261, Jun. 2002, 269 pages.

Rosenberg, J., "A Hitchhiker's Guide to the Session Initiation Protocol (SIP)", Network Working Group, Request for Comments: 5411, Feb. 2009, 39 pages.

International Search Report and Written Opinion, International Application No. PCT/US2016/014811, dated Aug. 25, 2016, pp. 1-8, KIPO.

Misu Toshiyuki et al., "Service Platform Based on the Next-Generation IMS," NEC Technical Journal 1.2, 2006, pp. 24-30, vol. 1, No. 2.

* cited by examiner

| Behaviour name | Stage (when?) | Problem fixed (what?) | Solution (how?) |
|---|---|---|---|
| PassThru | UA1 (resp. 2) making offer/answer, and UA2 (resp. 1) can process it | Basic B2B processing | Pass the offer/answer to the peer. |
| KickTransferNoSDP | Application triggered call transfer | Start SDP negotiation between UA1 and new UA2 | Send INVITE(noSDP) to UA2 |
| KickTransferReInv | Application triggered call transfer | Start SDP negotiation between UA1 and new UA2 | Send ReINVITE to UA1 |
| ConfirmEarlyAnswer | UA1 has early media established to dropped UA, and UA2 sends confirmed SDP answer (e.g. H'309) | Deal with UA2's SDP answer, whereas UA1 is not expecting any | Start "I'm lucky!" flow, sending UA2's answer as offer to UA1, hoping that at the end of the day RTP ports on both ends will match. |
| WeakSDPSync | In early media, UA2 was sent a trimmed SDP from UA1 (e.g. H'314) | Synchronize SDP view between UA1 and UA2 | Resend full UA1's SDP to UA2 |
| LandEarly | Early media. SIP flows on both ends are not symmetric. | Process PRACK / 200[PRACK] SIP messages when peer cannot. | Drop silently 200[PRACK] Respond automatically to PRACK. |

Fig. 11

PROCESSING CALL FLOWS

BACKGROUND

In the 1980s, the Telecom industry coined the term "Intelligent Network" (IN) to designate the standard architecture allowing operators to deliver call control value-added services (VAS), such as 800 numbers, prepaid, number portability, pay for me etc., to their end-customers. With the arrival of 3G technology in the early 2000s, this turned into "Next Generation IN" (NGIN).

Operators are now moving to a IP Multimedia Subsystem (IMS) network core which relies on the Session Initiation Protocol (SIP) to establish voice and multimedia calls. This technology became pervasive with the Voice over Internet Protocol (VoIP) trend and is used in most residential IP phones, and also in enterprise communication solutions. SIP is an Internet Engineering Task Force (IETF) initiative leveraging Hypertext Transfer Protocol (HTTP) paradigms, extending the concept of Uniform Resource Locator (URL), using text format for network messages with headers, body, and similar numerical response codes. However, in order to address the telephony requirements, SIP was also significantly augmented and is currently covered by more than 100 IETF Request for Comments (RFCs) (cf. only a handful for HTTP). Adoption of SIP by the Telecom industry, led by the 3GPP consortium, further added to that complexity.

Telecom software should meet high quality standards in term of functional compliance, availability, and real-time (fast and deterministic response time under high traffic). To achieve these objectives, it usually relies on very proven design patterns such as Finite State Machines (FSMs). This assumes, however, that the required network flows can be represented in this formalism with a human-readable complexity, and are steadily specified. This is no longer true with SIP-based NGIN because of its intrinsic complexity, and because network equipment providers come with their own interpretation of the standard and their own flows, due to that complexity. This results in each operator having its own specification of network flows, sometimes several applying to different networks (e.g. fixed and mobile), and even the specification of the same operator evolves as it deploys new equipment.

In addition to the usual voice service, 4G technology brings many other services such as IP telephony, gaming, high-definition mobile TV, video conferencing etc. This brings a significant complexity increase compared to legacy telephony, tied mainly to the network call flows used for establishing calls, and the wide variety of deployed equipment. The need, somewhat new in the telecom domain, is to be able to quickly adapt the network call flows to the capabilities of the deployed equipment and the requirements of the new services. The usual design patterns for developing call control software can hardly address these requirements.

BRIEF DESCRIPTION OF THE DRAWINGS

Various features of the present disclosure will be apparent from the detailed description which follows, taken in conjunction with the accompanying drawings, which together illustrate certain example features, and wherein:

FIG. 11 is a table according to certain examples.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
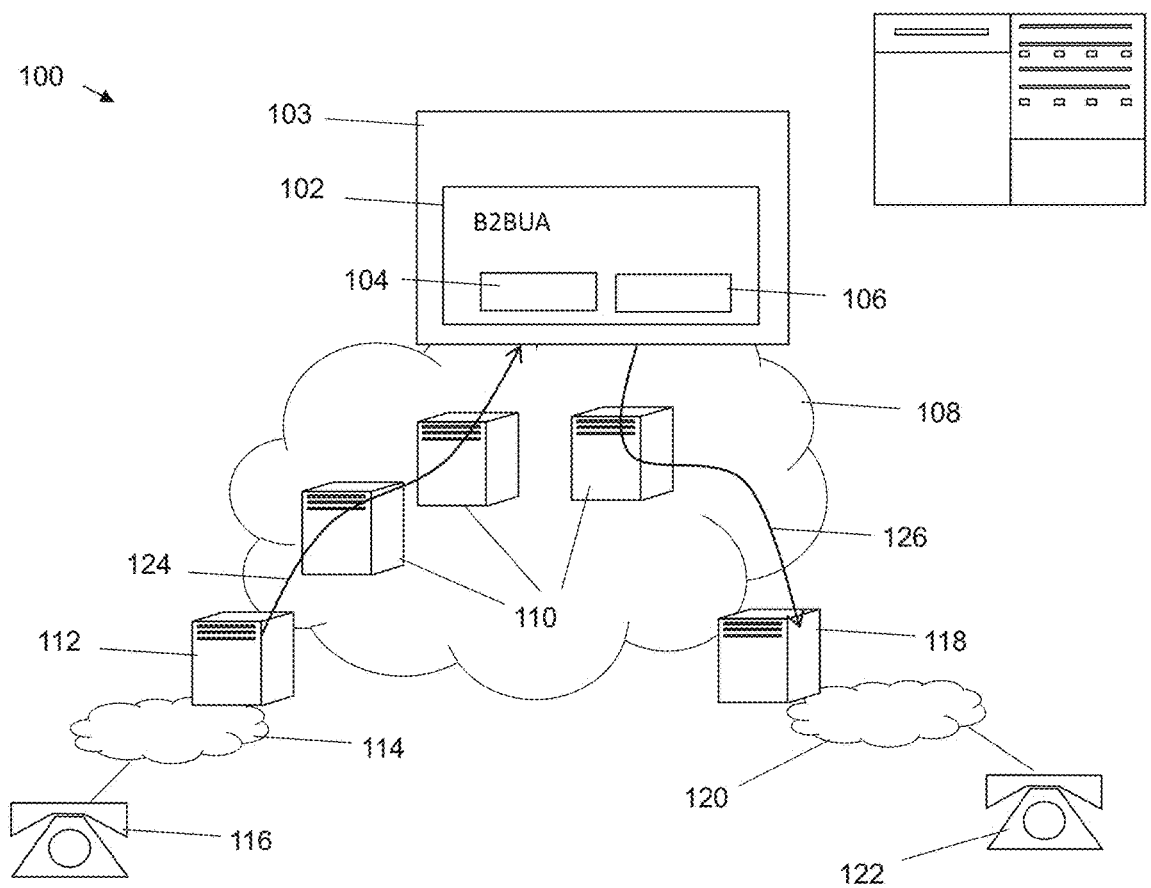
FIG. 1 shows a system diagram of a high-level core network architecture in which certain examples can be implemented.

FIG. 1 shows a system diagram of a NGIN 100 of a high-level core network architecture in which certain examples can be implemented. NGIN 100 includes an endpoint 116 (referred to in SIP as a user agent client (UAC)) connected to an access gateway 112 via an access network 114 and an endpoint 122 (referred to in SIP as a user agent server (UAS)) connected to an access gateway 118 via an access network 120. Access gateways 112 and 118 connect to IMS core network 108 which includes a number of core network elements 110. Access networks 114 and 120 could comprise a fixed or mobile telephony network or an IP network/Internet.

IMS core network 108 also includes an NGIN platform 103 which hosts VASs and typically has the capability to manage two (or more) SIP call legs for an end-users call for example one call leg with the calling party on one side, and another call leg with the called party on the other side. Accordingly, when enabled to operate in this capacity, NGIN platform 103 is commonly referred to as providing B2BUA functionality, denoted by 102 in FIG. 1.

For a first SIP call 124 to/from calling party UA 116 and a second SIP call 126 to called party UA 122, B2BUA 102 provides respectively a SIP UA server 104 capability and a SIP UA client 106 capability.

A prior art FSM design pattern assumes a kind of predefined itinerary between the initial state of the call, just before it starts, and its final state when the calling and called parties can talk to each other. At each stage (state) of the call it fully specifies upfront all the possible events (transitions), the actions that must executed upon each transition, and a resulting next state. That same approach is then repeated recurrently for each next state. Events are typically the SIP network messages coming from either party or other network elements, or the commands from the VASs sitting on top of the B2BUA. A simple B2BUA operation might consist simply in forwarding the incoming SIP messages from the calling to the called party. A typical IMS network call flow will be significantly more complex as it is impacted by the business logic of the VASs, examples being disconnecting both parties temporarily, putting called party on-hold and playing a prepaid warning tone to the caller etc., with each such sequence generating many SIP messages with varied contents to all the end points involved in the call.

The prior art FSM model does not scale beyond some reasonable amount of complexity, especially in the number of states and transitions. It is not flexible either as any change in the specification has a deep impact on the implemented state machine.

Instead of trying to plan upfront for all the possible cases, certain examples described herein therefore provide an "adaptive intelligence engine" inside an NGIN platform such as NGIN platform 103 of FIG. 1. In certain examples, upon an event occurring in a call, the adaptive intelligence engine takes into consideration the situation in the broad sense of the SIP call legs with each party, the capabilities of each party, the capabilities of intermediate network elements, and/or several more. With these inputs the adaptive intelligence engine decides the best next step based on some provisioned "call flow behaviours", in order to bring the call closer to its final state, and eventually establish it according to certain examples.

In certain examples, a plurality of call flow behaviours are defined to meet each operator's network expectations or constraints, and to address any specific SIP attributes of the deployed equipment. In certain examples, call flow behaviours can be added or removed as a need arises. For example, a very basic call flow behaviour may include passing SIP messages received on one side to the other side. A more specific call flow behaviour may for example include inviting a new participant to a call when a previous participant drops off the call.

Figure 2:
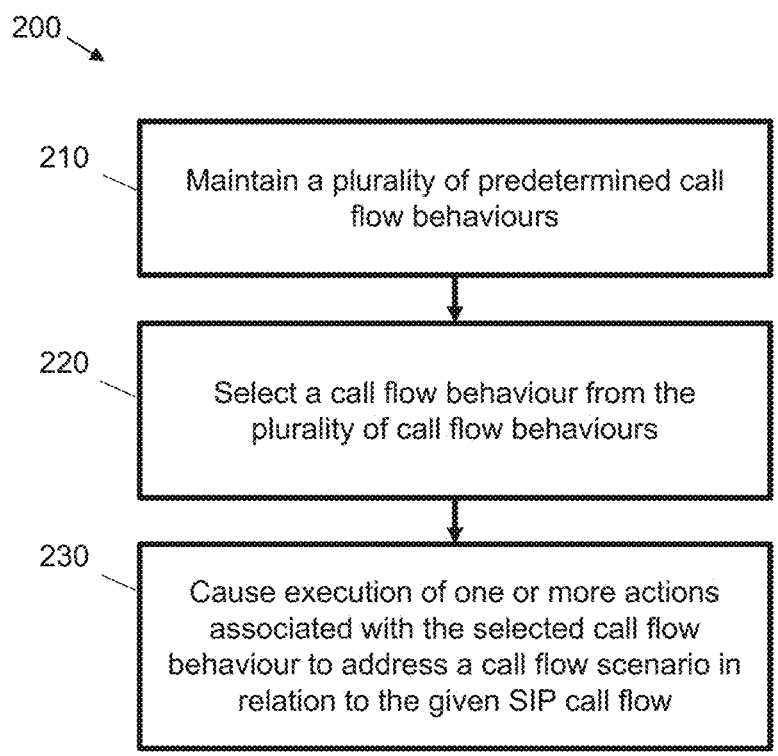
FIG. 2 shows a flow diagram according to certain examples.

FIG. 2 shows a flow diagram 200 according to certain examples for processing SIP call flows. Such call flow processing can be implemented as an adaptive intelligence engine configured in a B2BUA 102.

A plurality of predetermined call flow behaviours are maintained, as per element 210 in FIG. 2. Each call flow behaviour in the plurality is self-contained and independent from other call flow behaviours in the plurality. Each call flow behaviour in the plurality is applicable at one or more given call flow stages to provide one or more given actions for addressing a given call flow scenario.

In response to occurrence of a given trigger event in a given SIP call flow, a call flow behaviour from the plurality of call flow behaviours is selected, as per element 220 in FIG. 2.

Execution of one or more actions associated with the selected call flow behaviour is caused to address a call flow scenario in relation to the given SIP call flow, as per element 230 in FIG. 2.

Figure 3:
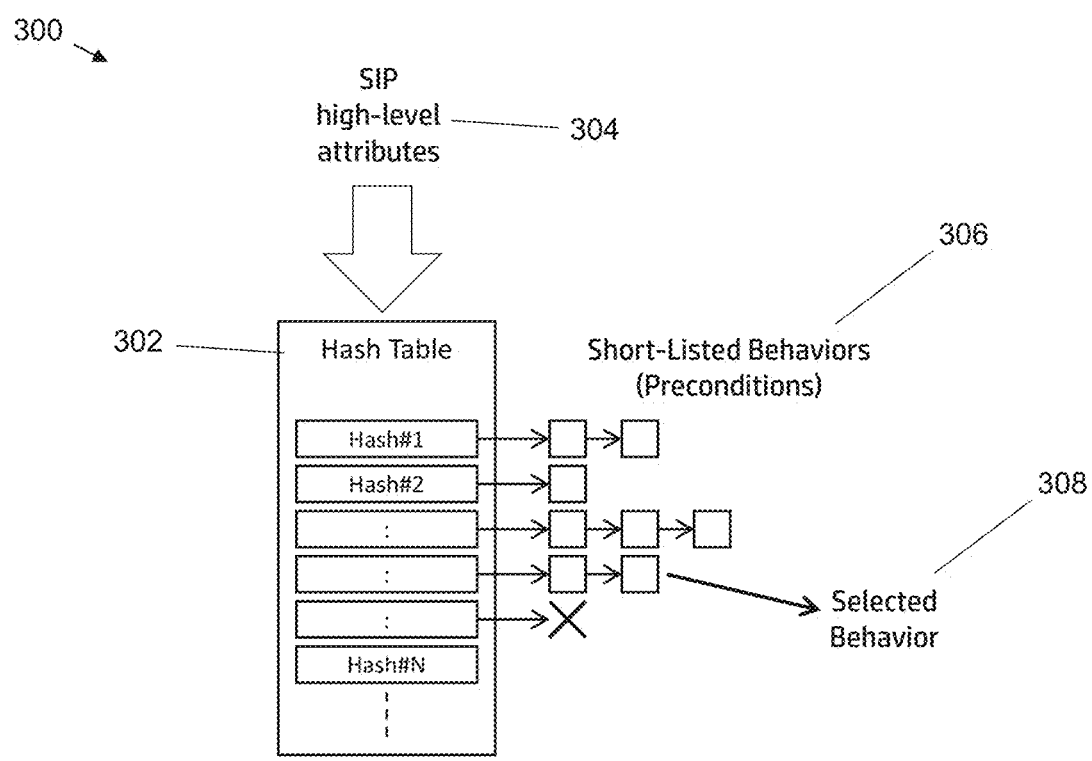
FIG. 3 shows a block diagram according to certain examples.

FIG. 3 shows a block diagram 300 according to the certain examples. Block diagram 300 depicts how a call flow behaviour for a trigger event is selected according to certain examples. In these examples, a call flow behaviour is selected in two steps. Firstly, a hashing algorithm based on one or more high-level attributes of each SIP call leg builds a short-list of candidate behaviours. Block diagram 300 includes a hash table 302 with N hashing entries. Hashing table 302 and a number of high-level SIP call flow attributes 304 are used to perform a hashing operation on the plurality of predetermined call flow behaviours to produce a shortlist of call flow behaviours 306.

Secondly, each candidate behaviour is evaluated (or 'tried') sequentially. A check is performed that one or more appropriate "preconditions" to run a given call flow behaviour are met. One or more preconditions specific to the call flow behaviour are used to select a call flow behaviour 308 to apply to the call flow. In contrast to the initial hashing on more general/high-level data, this second stage might deal for example with any detail of either SIP call leg, or of the global B2BUA call, that makes sense for that behaviour. In case of success, the behaviour is executed to handle the current stage of the call. The behaviour then takes any appropriate action with call parties and/or the VASs. If a precondition fails, then the next candidate call flow behaviour is evaluated.

Certain examples comprise performing a hashing operation on the plurality of predetermined call flow behaviours to produce a shortlist of call flow behaviours from the plurality of call flow behaviours; in such examples, the selecting is performed at least on the basis of the shortlist of call flow behaviours produced from the hashing operation.

In certain examples, the hashing operation is performed on the basis of one or more SIP call attributes associated with the given SIP call flow.

Certain examples comprise performing a sequential evaluation of call flow behaviours in the shortlist of call flow behaviours; in such examples, the selecting is performed at least on the basis of the result of the sequential evaluation.

In certain examples, the sequential evaluation is carried out for a given call flow behaviour in the shortlist on the basis of one or more preconditions specific to the given call flow behaviour.

In certain examples, the selected call flow behaviour comprises the first sequentially evaluated call flow behaviour from the shortlist of call flow behaviours for which all the call flow behaviour specific preconditions apply.

Certain examples comprise calculating the one or more preconditions specific to the given call behaviour on the basis of one or more SIP call attributes of specific interest to the given call behaviour.

In certain examples, the given trigger event comprises one or more of receipt of a network message associated with the given SIP call flow, receipt of an application command message associated with the given SIP call flow, and detection of a timer firing in association with the given SIP call flow.

In certain examples, a network message comprises a SIP signalling message associated with the given SIP call flow.

In certain examples, a network message comprises a media data message associated with the given SIP call flow; in some such examples, the media data message comprises session description protocol (SDP) data.

In certain examples, the one or more SIP call attributes comprise at least one of one or more SIP signalling attributes associated with at least one of a calling party call leg and a called party call leg for the given SIP call flow, one or more SIP media attributes associated with at least one of a calling party user agent call leg and a called party user agent call leg for the given SIP call flow, one or more capabilities of at least one of a calling party user agent and a called party user agent for the given SIP call flow, and one or more capabilities of at least one intermediate network element for the given SIP call flow. The at least one intermediate network element may for example comprise any of network elements 110 or access gateways 112, 118 in FIG. 1.

Figure 4:
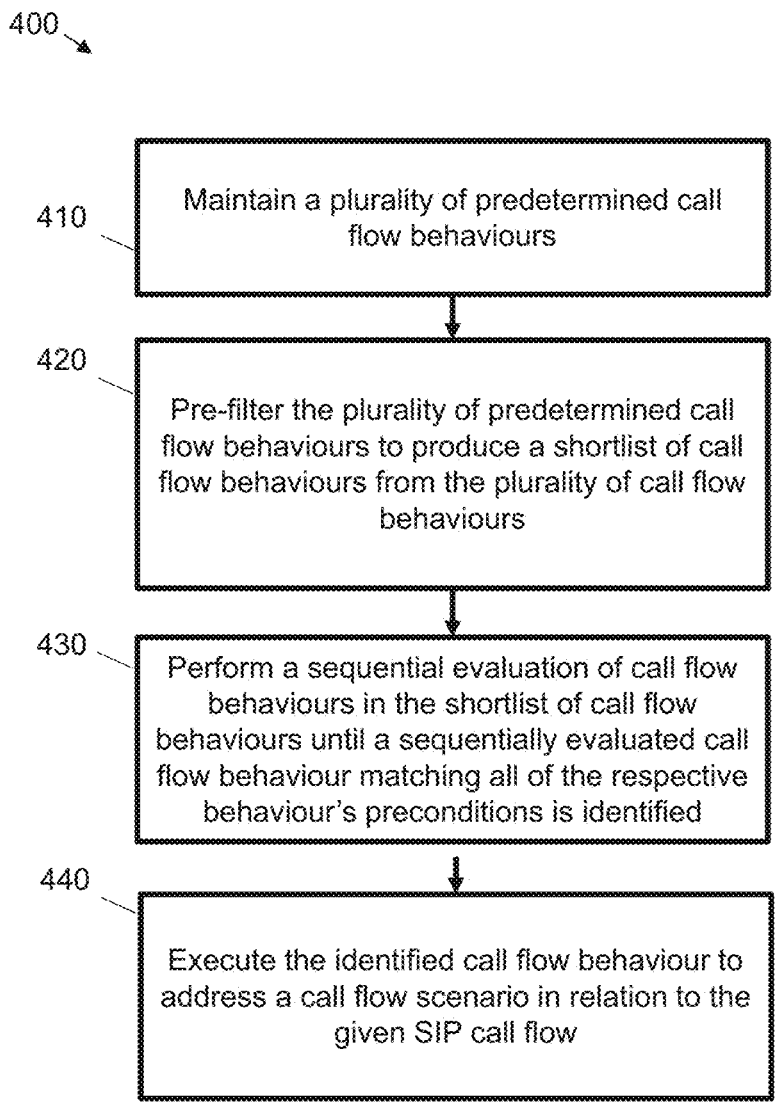
FIG. 4 shows a flow diagram according to certain examples

FIG. 4 shows a flow diagram 400 according to certain examples for processing SIP call flows. Such call flow processing can be implemented as an adaptive intelligence engine configured in a B2BUA 102 comprising one or more processors.

The one or more processors are configured to maintain a plurality of predetermined call flow behaviours, as per element 410 in FIG. 4. Each call flow behaviour in the plurality is self-contained and independent from other call flow behaviours in the plurality. Each call flow behaviour in the plurality is applicable at one or more given call flow stages to provide one or more given actions for addressing a given call flow scenario.

The one or more processors are configured to, in response to occurrence of a given trigger event in a given SIP call flow, pre-filter the plurality of predetermined call flow behaviours to produce a shortlist of call flow behaviours from the plurality of call flow behaviours, as per element 420 in FIG. 4.

The one or more processors are configured to perform a sequential evaluation of call flow behaviours in the shortlist of call flow behaviours until a sequentially evaluated call flow behaviour matching all of the respective call flow behaviour's preconditions is identified, as per element 430 in FIG. 4.

The one or more processors are configured to execute the identified call flow behaviour to address a call flow scenario in relation to the given SIP call flow, as per element 440 in FIG. 4.

In certain examples, the pre-filtering comprises performing a hashing operation on the plurality of predetermined call flow behaviours.

In certain examples, the hashing operation is performed on the basis of one or more SIP call attributes associated with the given SIP call flow.

In certain examples, the one or more preconditions for each sequentially evaluated call flow behaviour are specific to the respective call flow behaviour.

In certain examples, the one or more processors are configured to calculate the one or more preconditions specific to each sequentially evaluated call flow behaviour on the basis of one or more SIP call attributes specific to the respective call flow behaviour.

Figure 5:
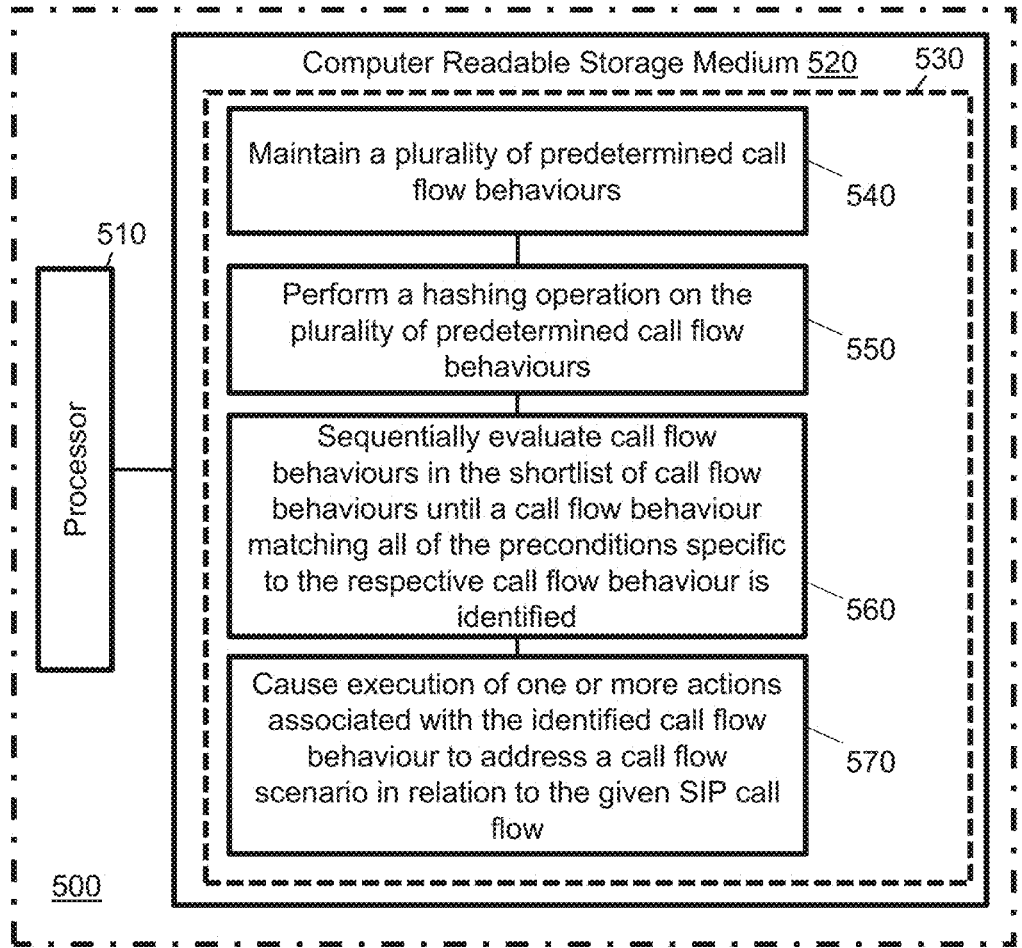
FIG. 5 is a schematic illustration of a processing device according to certain examples.

Certain system components and methods described herein may be implemented by way of machine readable instructions that are storable on a non-transitory storage medium. FIG. 5 shows an example of a device 500, for example a B2BUA 102, comprising at least one processor 510 arranged to retrieve data from a computer-readable storage medium 520. The computer-readable storage medium 520 comprises a set of computer-readable instructions 530 stored thereon. The at least one processor 510 is configured to load the instructions 530 into memory for processing. The instructions 530 are arranged to cause the at least one processor 510 to perform a series of actions.

Instruction 540 is configured to cause the processor 510 to maintain a plurality of predetermined call flow behaviours. Each call flow behaviour in the plurality is self-contained and independent from other call flow behaviours in the plurality. Each call flow behaviour in the plurality is applicable at one or more given call flow stages to provide one or more given actions for addressing a given call flow scenario.

Instruction 550 is configured to cause the processor 510 to, in response to receipt of a network or application command message or a timer firing in association with a given SIP call flow, perform, on the basis of one or more SIP call attributes associated with the given SIP call flow, a hashing operation on the plurality of predetermined call flow behaviours to produce a shortlist of call flow behaviours from the plurality of call flow behaviours.

Instruction 560 is configured to cause the processor 510 to sequentially evaluate call flow behaviours in the shortlist of call flow behaviours until a call flow behaviour matching all of the preconditions specific to the respective call flow behaviour is identified.

Instruction 570 is configured to cause the processor 510 to cause execution of one or more actions associated with the identified call flow behaviour to address a call flow scenario in relation to the given SIP call flow.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

Some examples involve considering the complexity and the number of behaviours that are required to map an operator's call flows. The complexity of a call flow behaviour can for example be measured as the number of lines of code, and/or as the ability to clearly specify its role and when it is involved in the call processing Some examples involve configuring the quality of the hashing operation. In some examples, the hashing operation is linked to the selection of the number of behaviours. In some examples, the hashing operation is configured to provide good scattering and return only a limited length short-list of candidate behaviours (say for example three or four) to be processed sequentially in order to address real-time requirements of telecom software.

Figure 6:
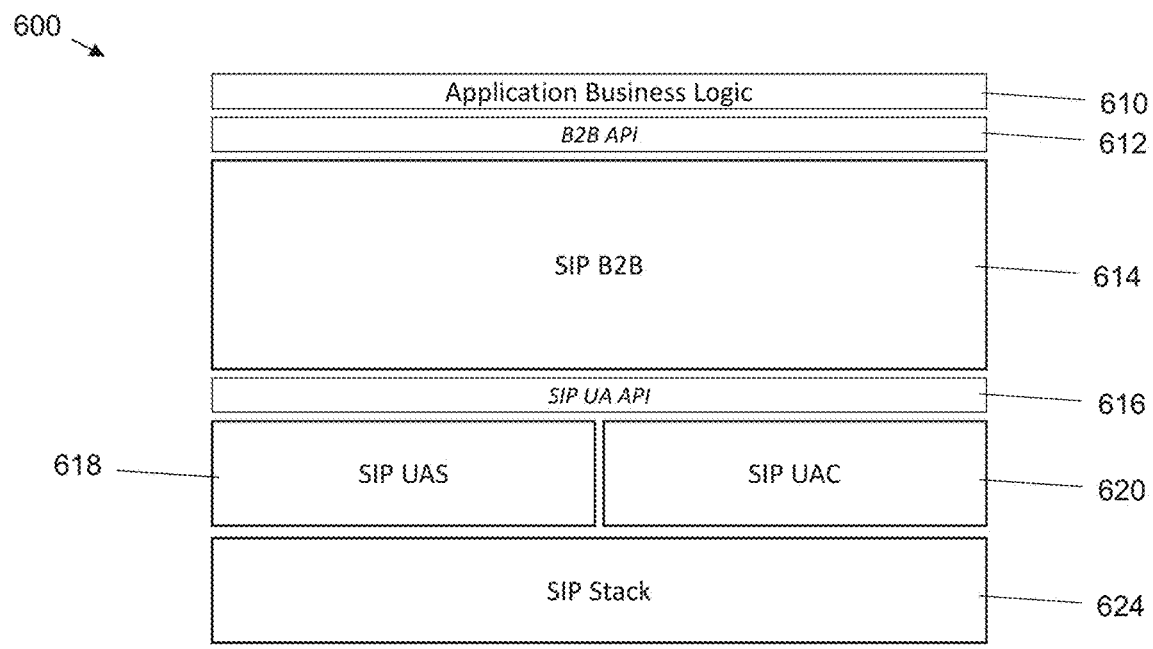
FIG. 6 shows a block diagram according to the prior art.

FIG. 6 shows a block diagram 600 according to the prior art. Block diagram 600 depicts a known SIP B2BUA architecture which includes a SIP stack 624 below SIP UA Server (UAS) 618 and SIP UA Client (UAC) 620 and then SIP UA API 616 layer for encapsulating the SIP stack. Above SIP UA API layer 616 is SIP B2B UA layer 614 and B2BUA API layer 612; the SIP B2B UA layer implements state machine design patterns in a fairly monolithic manner. Application business logic 610 (and/or VASs) is then located above the B2BUA API layer 612.

Figure 7:
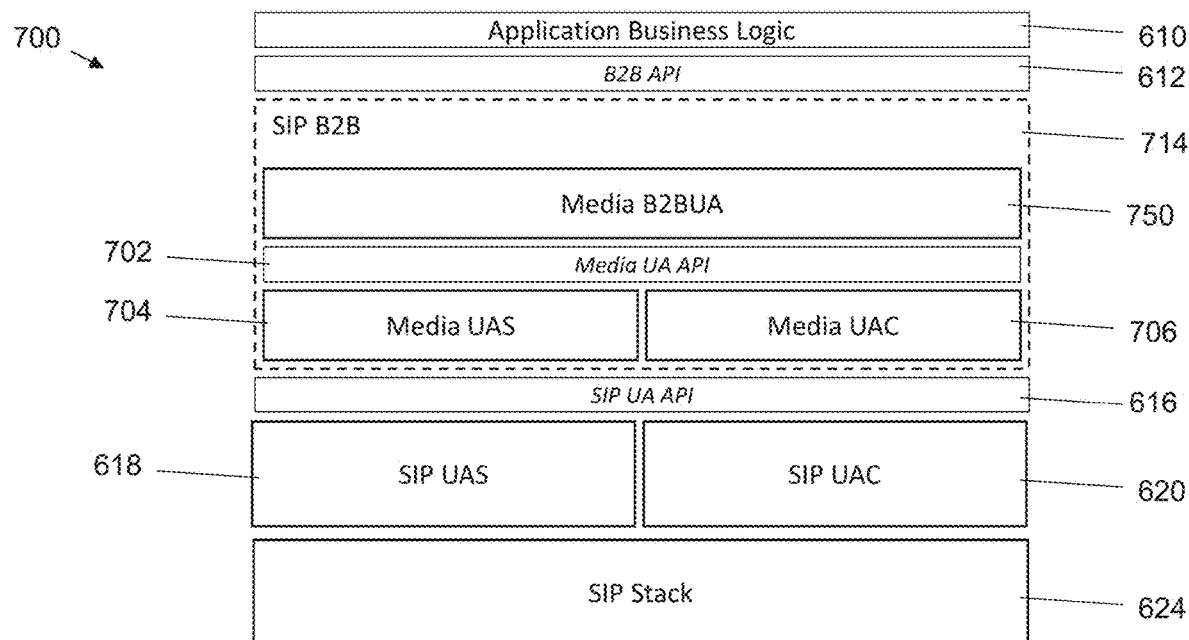
FIG. 7 shows a block diagram according to certain examples.

FIG. 7 shows a block diagram 700 according to certain examples. Block diagram 700 depicts a new SIP B2BUA architecture according to certain examples. FIG. 7 contains some similar elements to FIG. 6 which are similarly labelled.

The SIP B2BUA layer 714 of FIG. 7 comprises Media UA Server 704 and Media UA Client 706 located above the SIP UA API layer 616. A Media UA API layer 702 is located between Media UA Server 704/Media UA Client 706 and a Media B2BUA layer 750.

Certain examples relate to a new design which greatly simplifies the development of a SIP B2BUA, for example for application in a 3G/4G IP Multimedia Subsystem (IMS) core network.

Certain examples improve SIP B2BUA design by adding an appropriate abstraction layer on top of the raw SIP one and developing the B2BUA layer on top of that abstraction layer with a simplified interface.

An objective of signalling is the establishment of media channels (typically voice and possibly video) between the calling and the called party. Certain examples therefore run the B2BUA on top of a "Media API" instead of a SIP API.

The concept of media handling is well specified in SIP. It relies on Session Description Protocol (SDP) described in RFC 4566 which is relatively simple as it defines only two messages types (or message 'verbs') "offer" and "answer". These message types are typically hidden/encapsulated inside the various SIP requests and responses.

Certain examples comprise a new (third) additional message type/verb for addressing the case of SIP messages not conveying any media information. In some examples the new, third message type is called a "proceed" message type.

The new B2BUA of certain examples successfully and efficiently enables a B2BUA to implement very complex call flows, making use of these three message types (offer, answer, proceed) only (multiplied by two for the calling and the called parties sides) on top of a "Media UA Layer" interfacing this simplified Media API with the complex SIP one.

Figure 8:
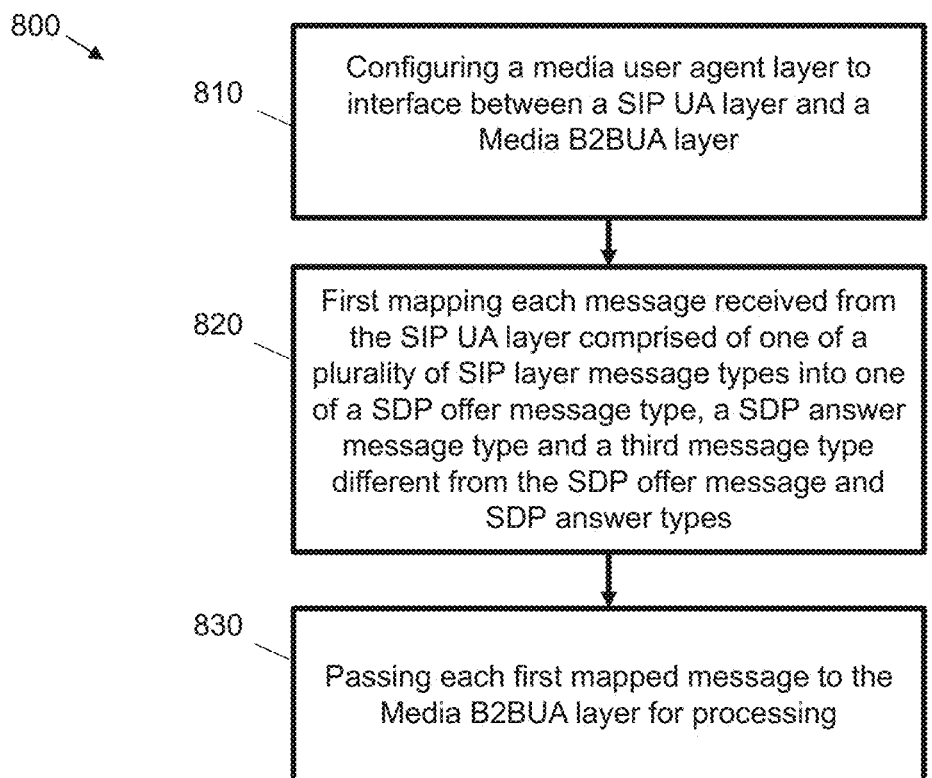
FIG. 8 shows a flow diagram according to certain examples.

FIG. 8 shows a flow diagram 800 according to certain examples for processing SIP call flows. Such call flow processing can for example be implemented in a SIP B2BUA layer 714 as depicted in FIG. 7.

A Media user agent (UA) layer 704/706 is configured to interface between a SIP UA layer 618/620 and a Media B2BUA layer 750, as per element 810 in FIG. 8.

For call flow operation in the SIP UA layer 618/620 to Media B2B UA layer 700 direction, the configuring comprises, at the Media UA layer 704/706 first mapping each message received from the SIP UA layer 618/620 comprised of one of a plurality of SIP layer message types into one of a SDP offer message type, a SDP answer message type and a third message type different from the SDP offer message and SDP answer types, as per element 820 in FIG. 8.

Each first mapped message is then passed to the Media B2B UA layer 750 for processing, as per element 830 in FIG. 8.

In certain examples, for call flow operation in the Media B2B layer 750 to SIP UA 618/620 layer direction, the configuring comprises, at the media UA layer 704/706, second mapping each message received from Media B2B 750 from one of the SDP offer message type, the SDP answer message type and the third type different from the SDP offer message and SDP answer types into one of a plurality of SIP UA layer types.

Each second mapped message is then passed to the SIP UA layer 618/620 for processing.

Certain examples comprise determining whether each received message comprises media data; in such examples, in response to a negative determination for a given received message, the first mapping comprises mapping the given received message into the third message type.

Certain examples comprise determining whether each received message comprises media data; in such examples, in response to a positive determination for a given received message, the first mapping comprises mapping the given received message into either the SDP offer message type or the SDP answer message type.

Certain examples comprise determining which of the SDP offer message type or the SDP answer message type the given received message is mapped into in the first mapping on the basis of contextual data for the given received message.

In certain examples, the plurality of SIP layer message types comprises more than three message types. SIP layer message types in the plurality of SIP layer message types may for example comprise one or more of INVITE, 180 Ringing[INVITE], 183 Session Progress[INVITE], 200 OK[INVITE], PRACK, 200 OK[PRACK], UPDATE, 200 OK[UPDATE], etc.

In certain examples, the determining comprises examining each received message to determine whether a respective message comprises session description protocol (SDP) media data.

In certain examples, the second mapping comprises determining which SIP layer message type in the plurality of SIP layer message types to map a given message into on the basis of contextual data for the given received message.

Certain examples comprise, for one or more of the first mapping and the second mapping, generating the contextual data for the given received message from one or more other messages of the call flow of the given received message.

Figure 9:
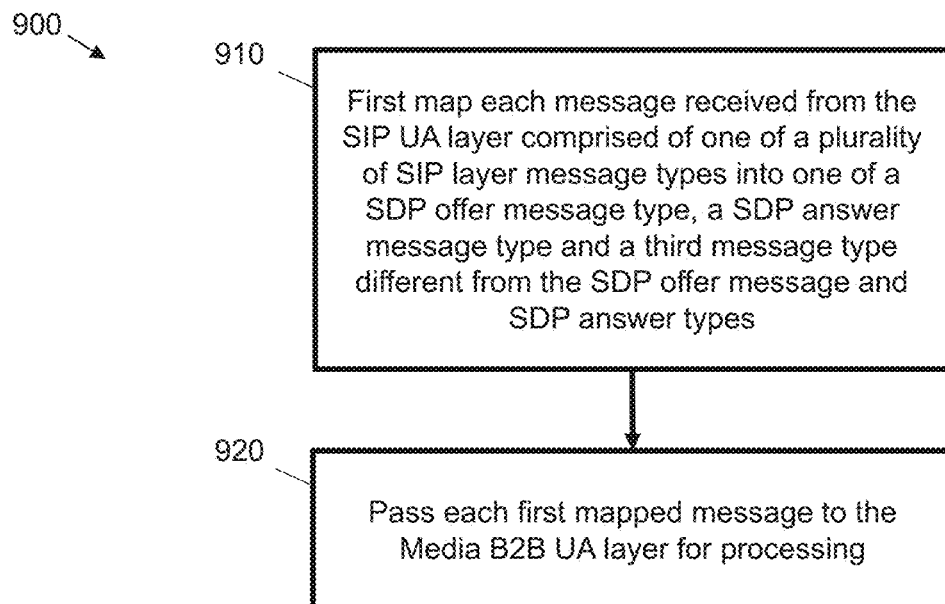
FIG. 9 shows a flow diagram according to certain examples.

FIG. 9 shows a flow diagram 900 according to certain examples for processing SIP call flows. Such call flow processing can for example be implemented in a SIP B2BUA layer 714 as depicted in FIG. 7.

In these examples, the B2BUA comprises a SIP UA layer, a Media B2BUA layer, and a media UA layer.

In these examples, the B2BUA also comprises one or more processors configured to, at the media UA layer, for call flow operation in the SIP UA layer to Media B2B UA API layer direction, first map each message received from the SIP UA layer comprised of one of a plurality of SIP layer message types into one of a SDP offer message type, a SDP answer message type and a third message type different from the SDP offer message and SDP answer types, as per element 910 in FIG. 9.

The one or more processors are also configured to, at the media UA layer, pass each first mapped message to the Media B2B UA layer for processing, as per element 920 in FIG. 9.

In certain examples, the one or more processors are configured to, at the media UA layer, for call flow operation in the Media B2B UA layer to SIP UA layer direction, second map each message received from the Media B2B UA layer from one of the SDP offer message type, the SDP answer message type and the third type different from the SDP offer message and SDP answer types into one of a plurality of SIP layer types on the basis of contextual data for each received message.

In some examples, the one or more processors are configured to, at the media UA layer pass each second mapped message to the SIP UA layer for processing.

In some examples, the one or more processors are configured to, at the media UA layer, determine whether each received message comprises session description protocol (SDP) media data; in such examples, in response to a negative determination for a given received message, the first mapping comprises mapping the given received message into the third message type.

In some examples, the one or more processors are configured to, at the media UA layer, determine whether each received message comprises session description protocol (SDP) media data; in such examples, in response to a positive determination for a given received message, the first mapping comprises mapping the given received message into either the SDP offer message type or the SDP answer message type on the basis of contextual data for the given received message.

In some examples, the one or more processors are configured to, at the media UA layer, generate the contextual data for the given or each received message from one or more other messages of the call flow of the given or each received message.

Figure 10:
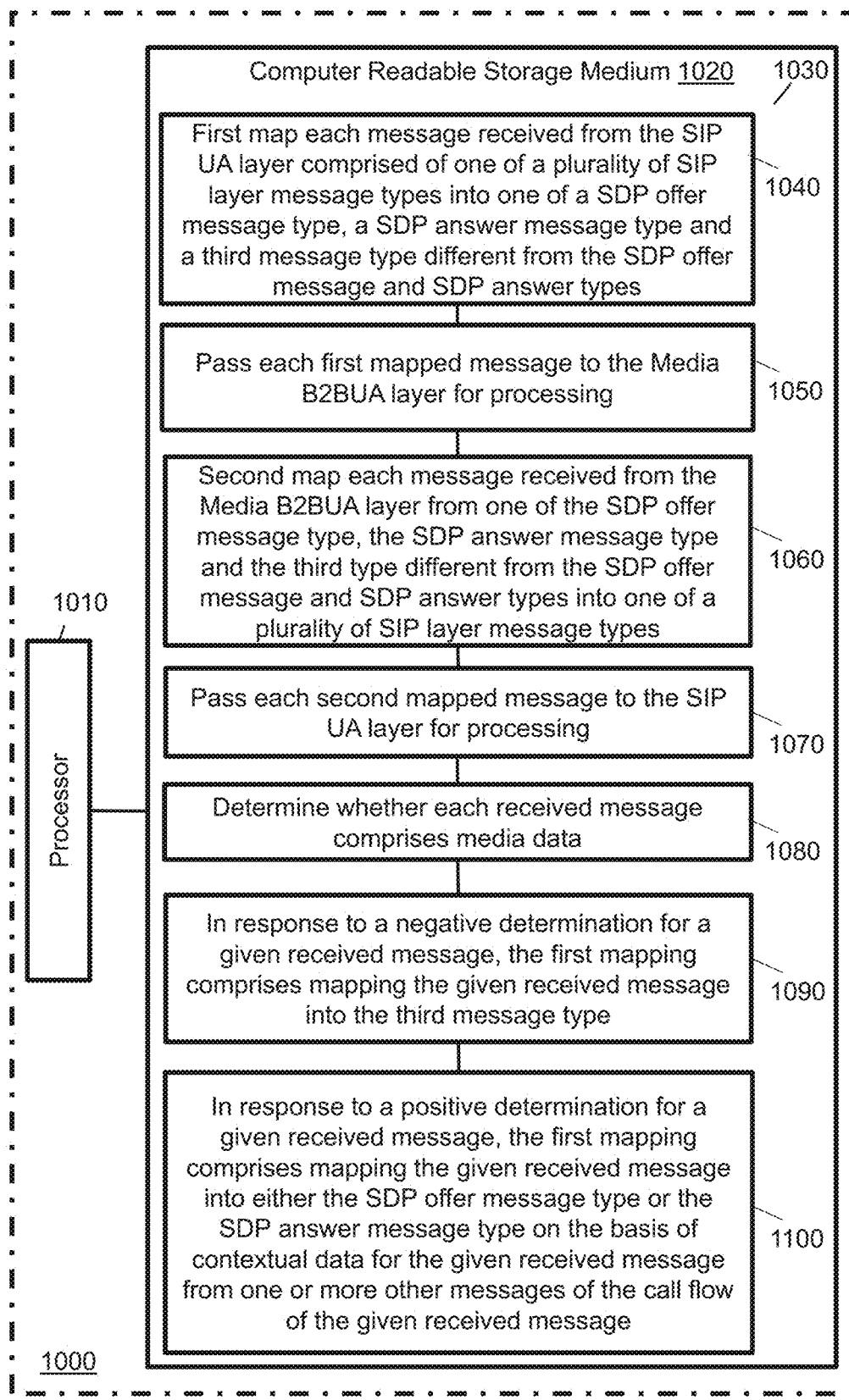
FIG. 10 is a schematic illustration of a processing device according to certain examples.

Certain system components and methods described herein may be implemented by way of machine readable instructions that are storable on a non-transitory storage medium. FIG. 10 shows an example of a device 1000, for example a B2BUA 102, comprising at least one processor 1010 arranged to retrieve data from a computer-readable storage medium 1020. The computer-readable storage medium 1020 comprises a set of computer-readable instructions 1030 stored thereon. The at least one processor 1010 is configured to load the instructions 1030 into memory for processing. The instructions 1030 are arranged to cause the at least one processor 1010 to perform a series of actions.

Instruction 1040 is configured to cause the processer 1010 to, at a media UA layer located between a SIP UA layer and a Media B2BUA layer first map each message received from the SIP UA layer comprised of one of a plurality of SIP layer message types into one of a SDP offer message type, a SDP answer message type and a third message type different from the SDP offer message and SDP answer types.

Instruction 1050 is configured to cause the processer 1010 to, at the media UA layer, pass each first mapped message to the Media B2BUA layer for processing.

Instruction 1060 is configured to cause the processer 1010 to, at the media UA layer, second map each message received from the Media B2BUA layer from one of the SDP offer message type, the SDP answer message type and the third type different from the SDP offer message and SDP answer types into one of a plurality of SIP layer message types.

Instruction 1070 is configured to cause the processer 1010 to, at the media UA layer, pass each second mapped message to the SIP UA layer for processing.

Instruction 1080 is configured to cause the processer 1010 to, at the media UA layer, determine whether each received message comprises media data.

Instruction 1090 is configured to cause the processer 1010 to, at the media UA layer, in response to a negative determination for a given received message, the first mapping comprises mapping the given received message into the third message type.

Instruction 1100 is configured to cause the processer 1010 to, at the media UA layer, in response to a positive determination for a given received message, the first mapping comprises mapping the given received message into either the SDP offer message type or the SDP answer message type on the basis of contextual data for the given received message from one or more other messages of the call flow of the given received message.

In some examples, some common state attributes of SIP call legs are employed as hashing criteria (for example signaling state and media state) resulting in about 60 possible hash values allowing a satisfactory scattering level (knowing that many call flow behaviours map to multiple hash values), and also to clearly represent the scope of each call flow behaviour.

Rather than having a static pre-defined state machine, a B2BUA configured according to certain examples described herein, is able to adapt to the current call situation. The architecture is highly customizable as a result of the configured behaviours and the core engine. Different configurations can completely change the B2BUA call flows.

FIG. 11 is a table according to certain examples. The table of FIG. 11 includes some call flow behaviours according to certain examples. The table includes a name for each example call flow behaviour, a stage at which each call flow behaviour might be applicable, a given call flow scenario which each call flow behaviour might address, and one or more actions which might be taken according to each call flow behaviour.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A method of processing session initiation protocol (SIP) call flows, the method comprising:
   maintaining, at a back-to-back user agent (B2BUA), a plurality of predetermined call flow behaviors, each call flow behavior in the plurality being self-contained and independent from other call flow behaviors in the plurality, each call flow behavior in the plurality being applicable at one or more given call flow stages to provide one or more given actions for addressing a given call flow scenario;
   producing, by the B2BUA, a shortlist of call flow behaviors from the plurality of call flow behaviors, wherein the shortlist of call flow behaviors is produced by performing a hashing operation on the plurality of predetermined call flow behaviors;
   sequentially evaluating each call flow behavior from the shortlist of call flow behaviors;
   in response to occurrence of a given trigger event in a given SIP call flow, selecting, by the B2BUA, a call flow behavior from the shortlist of call flow behaviors from the plurality of call flow behaviors, wherein the selecting is performed at least on the basis of the shortlist of call flow behaviors produced from the hashing operation; and
   causing execution of one or more actions associated with the selected call flow behavior, at the B2BUA, wherein the one or more actions address a call flow scenario in relation to the given SIP call flow.

2. The method of claim 1, wherein the hashing operation is performed on the basis of one or more SIP call attributes associated with the given SIP call flow.

3. The method of claim 1, wherein the selecting is performed at least on the basis of the result of the sequential evaluation.

4. The method of claim 3, wherein the sequential evaluation is carried out for a given call flow behavior in the shortlist on the basis of one or more preconditions specific to the given call flow behavior.

5. The method of claim 4, wherein the selected call flow behavior comprises the first sequentially evaluated call flow behavior from the shortlist of call flow behaviors for which all call flow behavior specific preconditions apply.

6. The method of claim 4, comprising calculating the one or more preconditions specific to the given call behavior on the basis of one or more SIP call attributes of specific interest to the given call flow behavior.

7. The method of claim 1, wherein the given trigger event comprises one or more of:
   receipt of a network message associated with the given SIP call flow,
   receipt of an application command message associated with the given SIP call flow, and
   detection of a timer firing in association with the given SIP call flow.

8. The method of claim 2 or 6, wherein the one or more SIP call attributes comprise at least one of:
   one or more SIP signaling attributes associated with at least one of a calling party call leg and a called party call leg for the given SIP call flow,
   one or more SIP media attributes associated with at least one of a calling party user agent call leg and a called party user agent call leg for the given SIP call flow, one or more capabilities of at least one of a calling party user agent and a called party user agent for the given SIP call flow, and one or more capabilities of at least one intermediate network element for the given SIP call flow.

9. A back-to-back user agent (B2BUA) for use in processing session initiation protocol (SIP) call flows, the B2BUA comprising one or more processors configured to:

maintain a plurality of predetermined call flow behaviors, each call flow behavior in the plurality being self-contained and independent from other call flow behaviors in the plurality, each call flow behavior in the plurality being applicable at one or more given call flow stages to provide one or more given actions for addressing a given call flow scenario;

in response to occurrence of a given trigger event in a given SIP call flow, pre-filter the plurality of predetermined call flow behaviors to produce a shortlist of call flow behaviors from the plurality of call flow behaviors, wherein the shortlist of call flow behaviors is also produced by performing a hashing operation on the plurality of predetermined call flow behaviors;

perform a sequential evaluation of call flow behaviors in the shortlist of call flow behaviors until a sequentially evaluated call flow behavior matching preconditions of all of the respective call flow behaviors are identified;

selecting the sequentially evaluated call flow behavior, wherein the selecting is performed at least on the basis of the shortlist of call flow behaviors produced from the hashing operation; and execute the identified call flow behavior to address a call flow scenario in relation to the given SIP call flow.

10. The B2BUA of claim 9, wherein the pre-filtering comprises performing the hashing operation on the plurality of predetermined call flow behaviors.

11. The B2BUA of claim 10, wherein the hashing operation is performed on the basis of one or more SIP call attributes associated with the given SIP call flow.

12. The B2BUA of claim 9, wherein the one or more preconditions for each sequentially evaluated call flow behavior are specific to the respective call flow behavior.

13. The B2BUA of claim 12, the one or more processors being configured to calculate the one or more preconditions specific to each sequentially evaluated call flow behavior on the basis of one or more SIP call attributes specific to the respective call flow behavior.

14. A non-transitory computer-readable storage medium storing instructions that, if executed by one or more processors of a back-to-back user agent (B2BUA), cause the one or more processors to:

maintain a plurality of predetermined call flow behaviors, each call flow behavior in the plurality being self-contained and independent from other call flow behaviors in the plurality, each call flow behavior in the plurality being applicable at one or more given call flow stages to provide one or more given actions for addressing a given call flow scenario;

in response to receipt of a network or application command message or a timer firing in association with a given SIP call flow, perform, on the basis of one or more SIP call attributes associated with the given SIP call flow, a hashing operation on the plurality of predetermined call flow behaviors to produce a shortlist of call flow behaviors from the plurality of call flow behaviors;

sequentially evaluate call flow behaviors in the shortlist of call flow behaviors until a call flow behavior matching all of the preconditions specific to the respective call flow behavior is identified; and cause execution of one or more actions associated with the identified call flow behavior to address a call flow scenario in relation to the given SIP call flow.

15. The method of claim 1, further comprising:

determining that a precondition fails from the sequential evaluation of each call flow behavior from the shortlist of call flow behaviors; and evaluating a next call flow behavior from the shortlist of call flow behaviors.

16. The method of claim 1, further comprising:

determining a complexity of each of the plurality of predetermined call flow behaviors, wherein the complexity is increased with a greater number of lines of code.

17. The method of claim 1, further comprising:

determining a complexity of each of the plurality of predetermined call flow behaviors, wherein the complexity is increased with an ability to specify a role of an operator role when the operator is involved in call processing.

18. The method of claim 1, wherein the back-to-back user agent (B2BUA) comprises Media User Agent (UA) Server and Media UA Client located above a SIP UA application programming interface (API) layer.

19. The method of claim 18, wherein the Media UA Server layer and the Media UA Client layer are configured to interface between a SIP UA layer and a Media B2BUA layer.

* * * * *